No. 856,699. PATENTED JUNE 11, 1907.
F. G. H. HEYNAU.
DRILL CHUCK.
APPLICATION FILED NOV. 27, 1906.
FIG. 1.
FIG. 2.
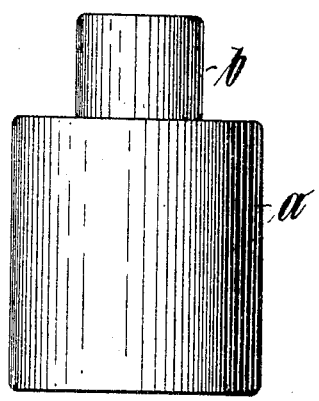
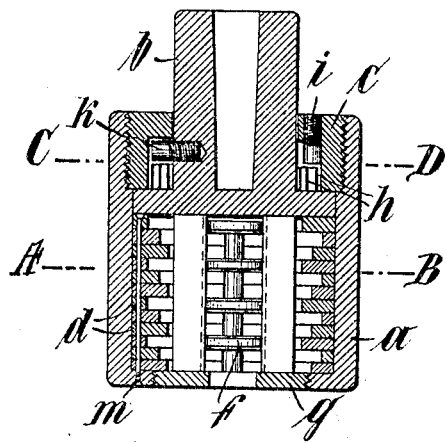
FIG. 3. FIG. 4.
FIG. 5.
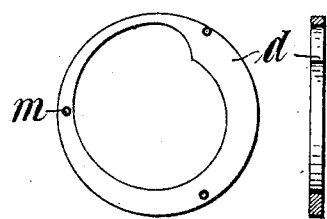
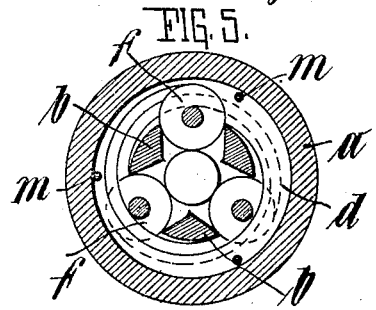
FIG. 6. FIG. 7. FIG. 8.
FIG. 9.
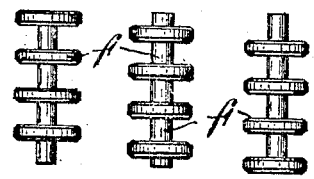
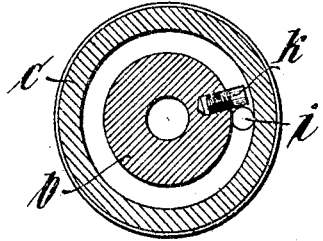
Witnesses:
L. H. Staaden.
Karl Reich
Inventor:
Felix Gustav Hans Heynau

UNITED STATES PATENT OFFICE.

FELIX GUSTAV HANS HEYNAU, OF DOTZHEIM, NEAR WIESBADEN, GERMANY.

DRILL-CHUCK.

No. 856,699.	Specification of Letters Patent.	Patented June 11, 1907.

Application filed November 27, 1906. Serial No. 345,410.

*To all whom it may concern:*

Be it known that I, FELIX GUSTAV HANS HEYNAU, engineer, a subject of the King of Saxony, residing at Dotzheim, near Wiesbaden, in the Kingdom of Prussia and German Empire, have invented new and useful Improvements in Drill-Chucks, of which the following is a specification.

Drill chucks are already known in which the drill is held between rollers which are displaceably arranged in a guide piece and are constantly pressed against the tool by a rotatable sleeve provided with eccentric cam faces by means of a spring (see for example German Patent No. 160,153 of class 49ª). A great defect of this arrangement is that the same chuck can only be used for drills of a small number of different sizes, so that say four different chucks are required to take drills of from 1 to 10 mm.

The present invention has for its object to utilize this principle in such a manner that a very large number of different sizes of drill can be held in one chuck, for example, the sizes 0.1 to 10 mm. which are used in practice in quick drilling machines.

In the accompanying drawings, Figure 1 represents the drill chuck in elevation. Fig. 2 is a longitudinal section through the same. Figs. 3 and 4 show a cam element in front elevation and in cross section, and, Fig. 5 represents the chuck in section on the line A—B of Fig. 2. Figs. 6, 7 and 8 illustrate the rollers *f* grooved to correspond with the cam elements, and Fig. 9 represents a section on the line C—D of Fig. 2 showing the stop pins *i* and *k* limiting the opening movement of the chuck.

In this constructional form the cam faces are composed of narrow elements *d* which in place of being utilized for about one-third of a revolution of the sleeve *a* as in known forms of chuck, are utilized throughout a complete revolution and therefore with equal pitch ratios of the cams are able to produce about three times as large a displacement of the clamping rollers. The separate cam elements *d* are arranged at an angle of 120° relatively to each other and are fixed in the sleeve *a* by means of rivets *m*; upon rotating the sleeve *a* relatively to the body of the chuck *b* they displace the correspondingly grooved rollers *f*. One end of a spring *h* is fixed to the body of the chuck *b* while its other end is fixed to the bush *c*, and owing to the screwing of the bush *c* with the sleeve *a* tends to maintain the chuck invariably closed. For the purpose of facilitating the mounting the sleeve *a* receives a detachable screw disk *g*.

What I do claim as my invention and desire to secure by Letters Patent, is—

In a chuck, a holder (*a*) having an axial cavity and symmetrically arranged radial slots, freely movable clamping means seated in said slots, a series of cam rings secured to the holder (*a*) and surrounding said clamping means and relatively rotatable with respect thereto, each ring having a cam surface of a graduated pitch extending substantially around its inner periphery, the several rings being symmetrically arranged in said holder (*a*) and angularly displaced to correspond with the position of said clamping means, substantially as described.

In testimony whereof I have signed my name to this specification in the presence of two subscribing witnesses.

FELIX GUSTAV HANS HEYNAU.

Witnesses:
HEINRICH OTTO GEORG JAEGER,
FRITZ HUF AUGUST CARL MERK MAEH.